A. W. ROOVERS.
COIN CONTROLLED ELECTRICAL APPARATUS.
APPLICATION FILED OCT. 1, 1906.

912,734.

Patented Feb. 16, 1909.
7 SHEETS—SHEET 1.

Witnesses

Inventor:
Alfred W. Roovers,
by Dodge and Sons
Attorneys

A. W. ROOVERS.
COIN CONTROLLED ELECTRICAL APPARATUS.
APPLICATION FILED OCT. 1, 1906.
912,734.
Patented Feb. 16, 1909.
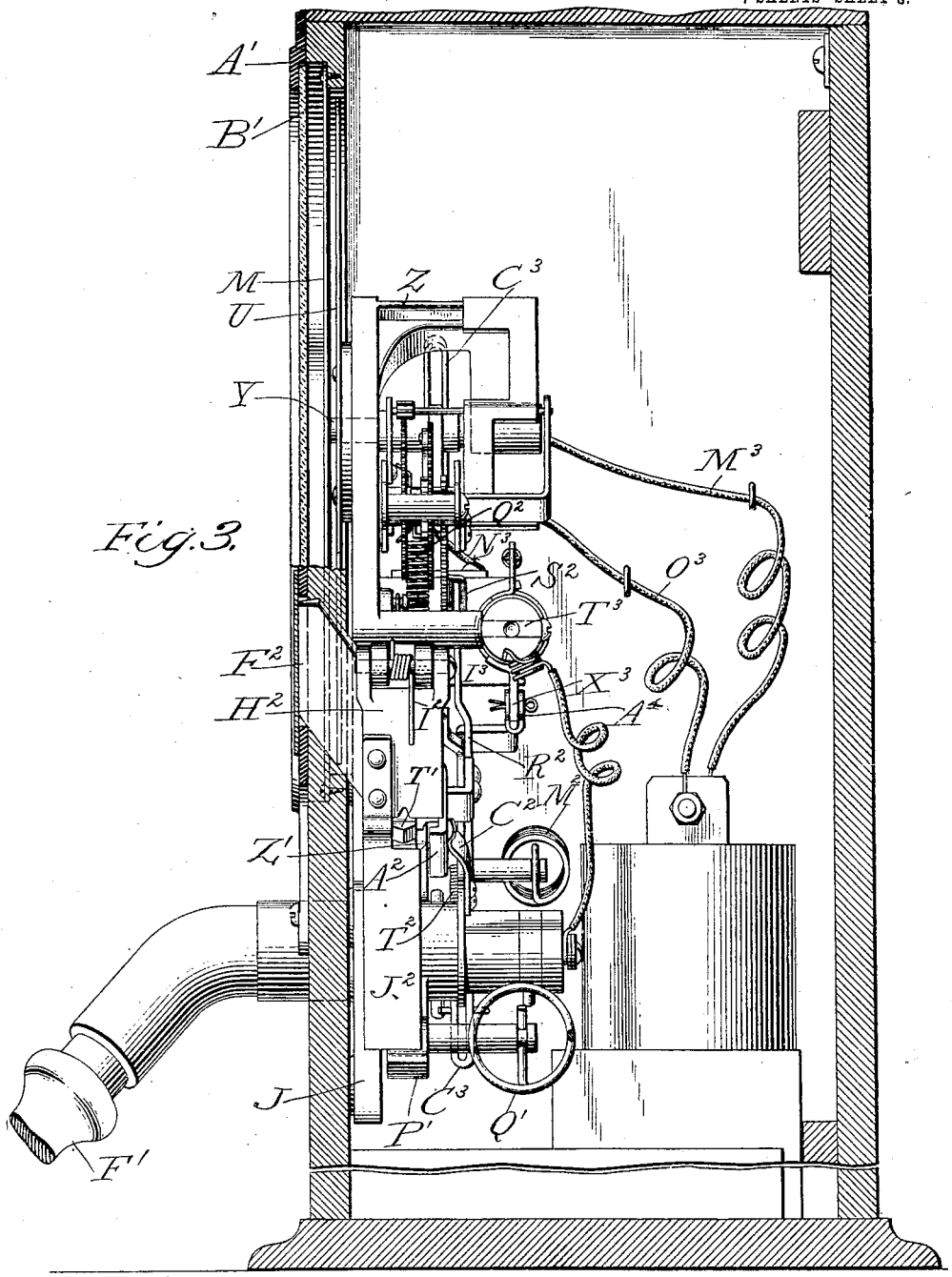

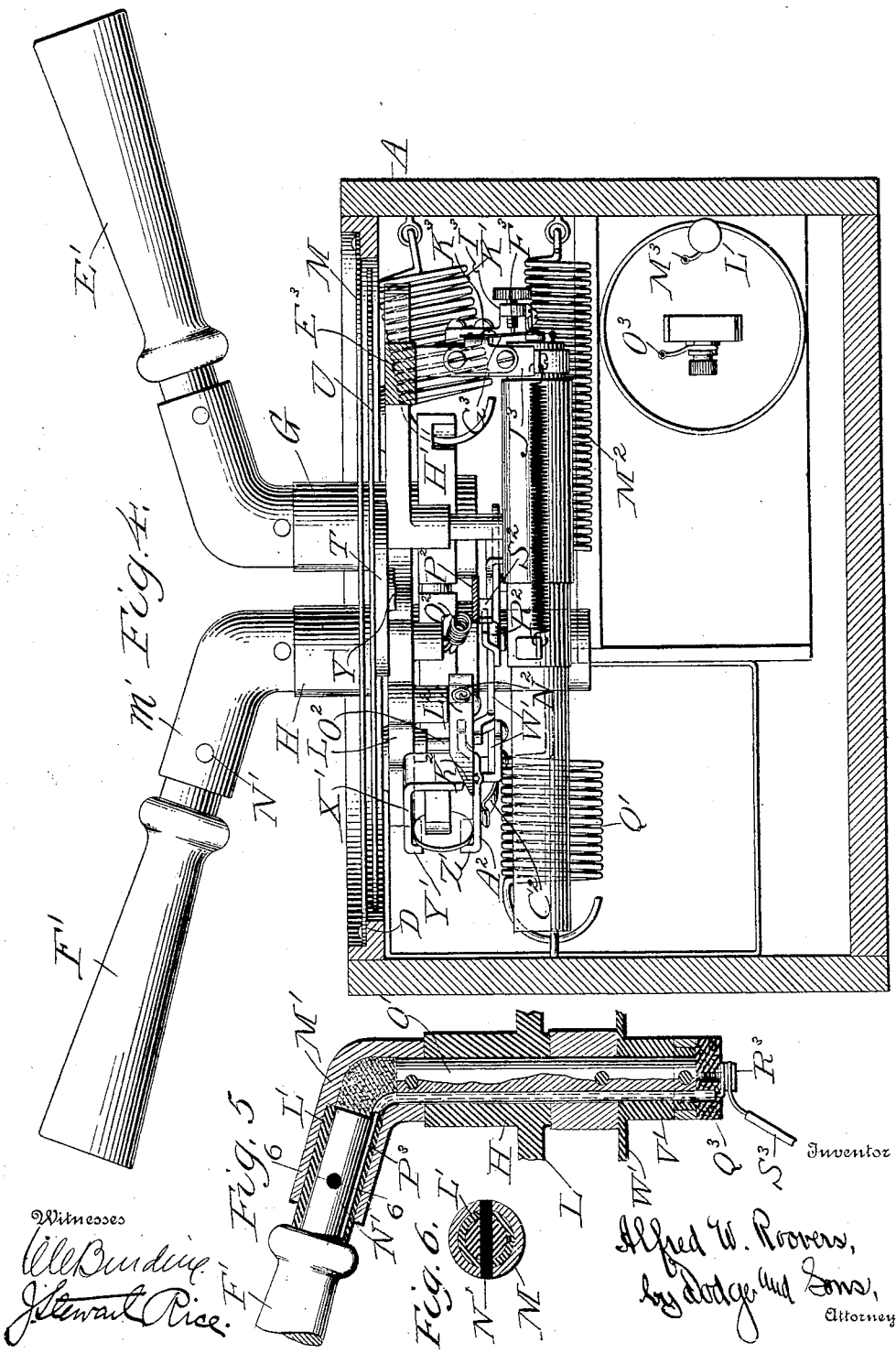

A. W. ROOVERS.
COIN CONTROLLED ELECTRICAL APPARATUS.
APPLICATION FILED OCT. 1, 1906.
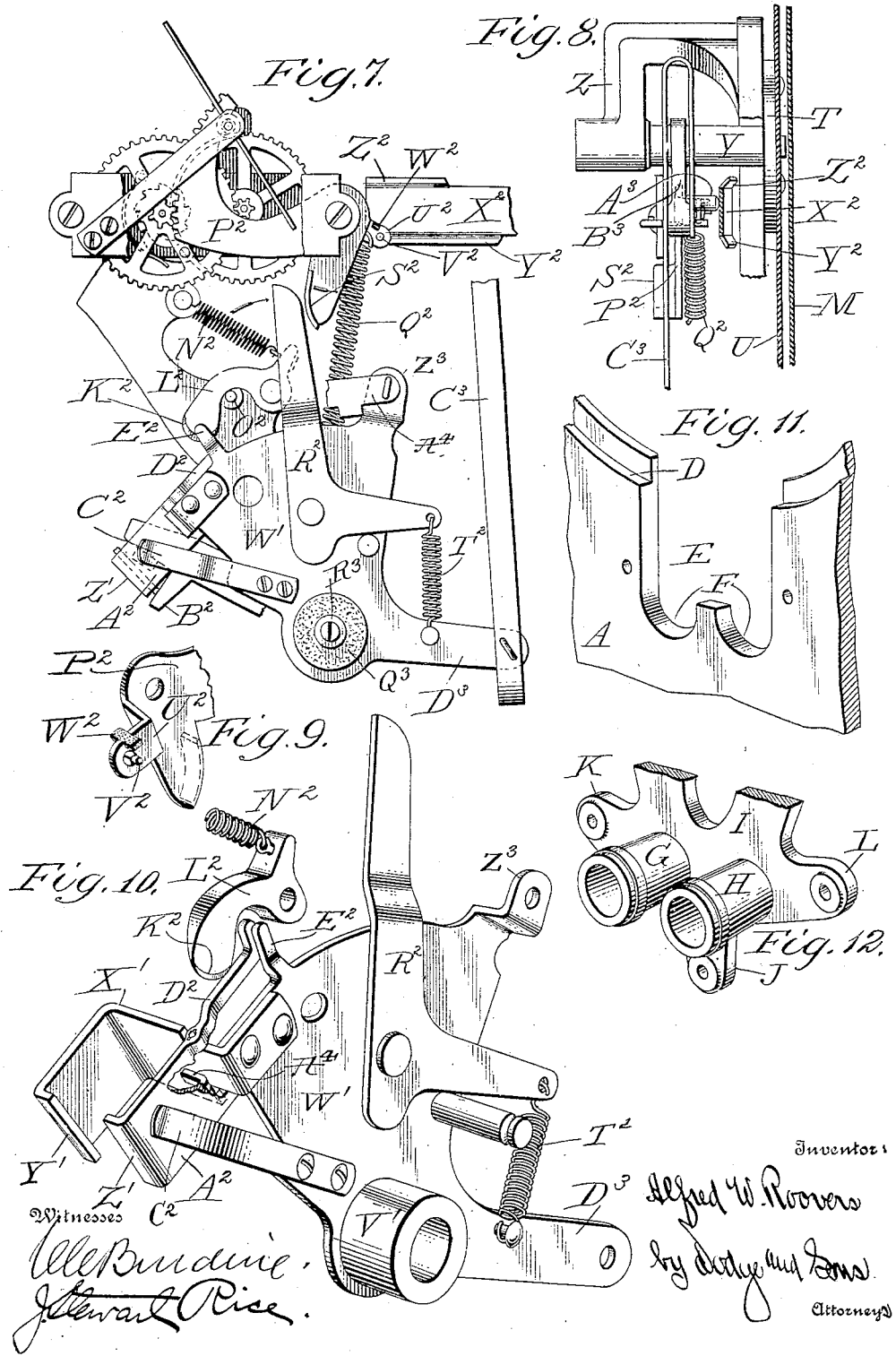

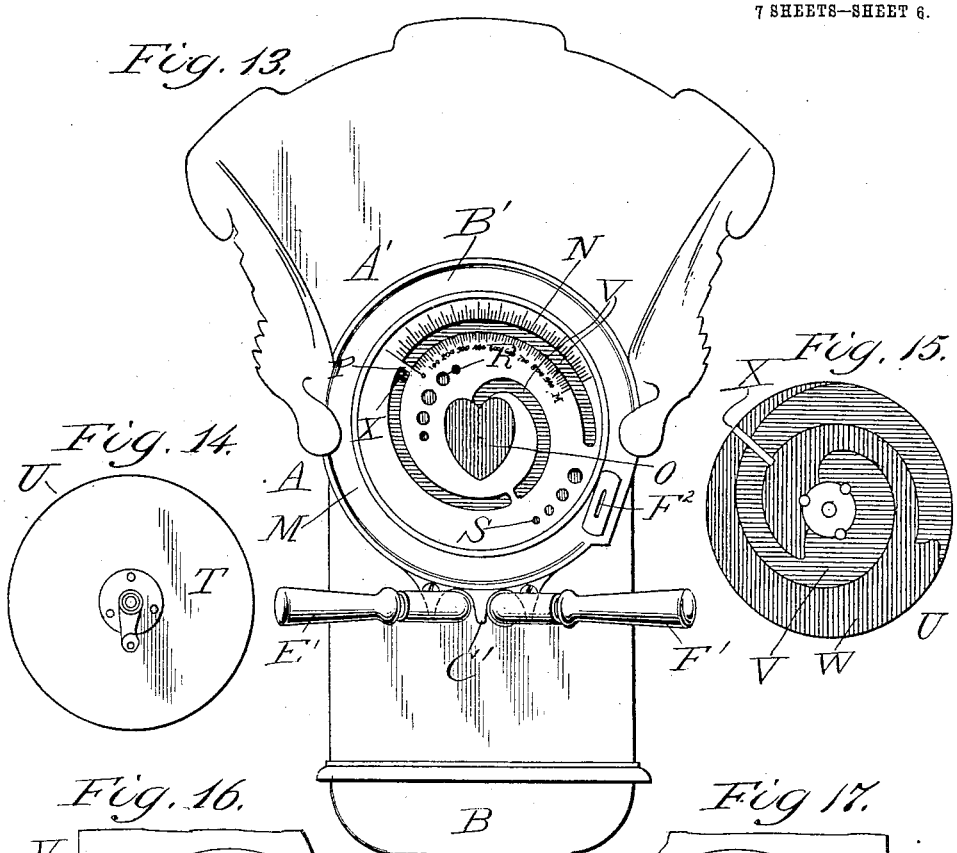

A. W. ROOVERS.
COIN CONTROLLED ELECTRICAL APPARATUS.
APPLICATION FILED OCT. 1, 1906.
912,734.
Patented Feb. 16, 1909.
7 SHEETS—SHEET 7.
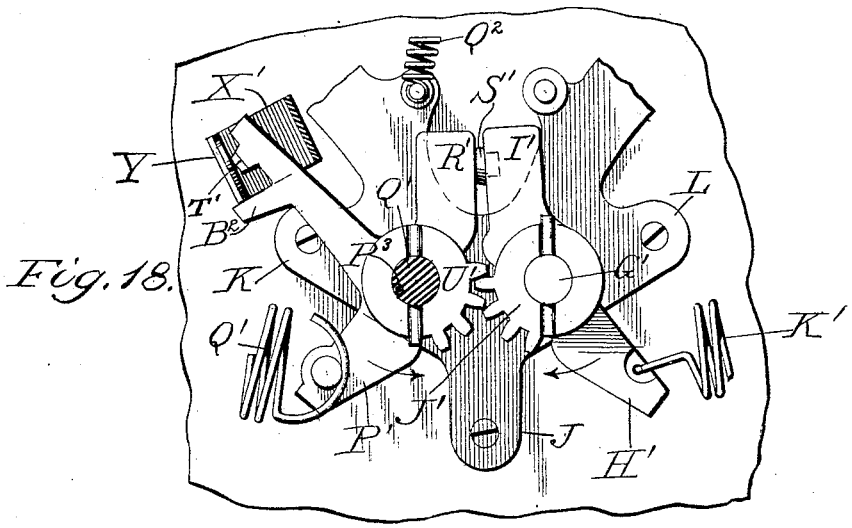
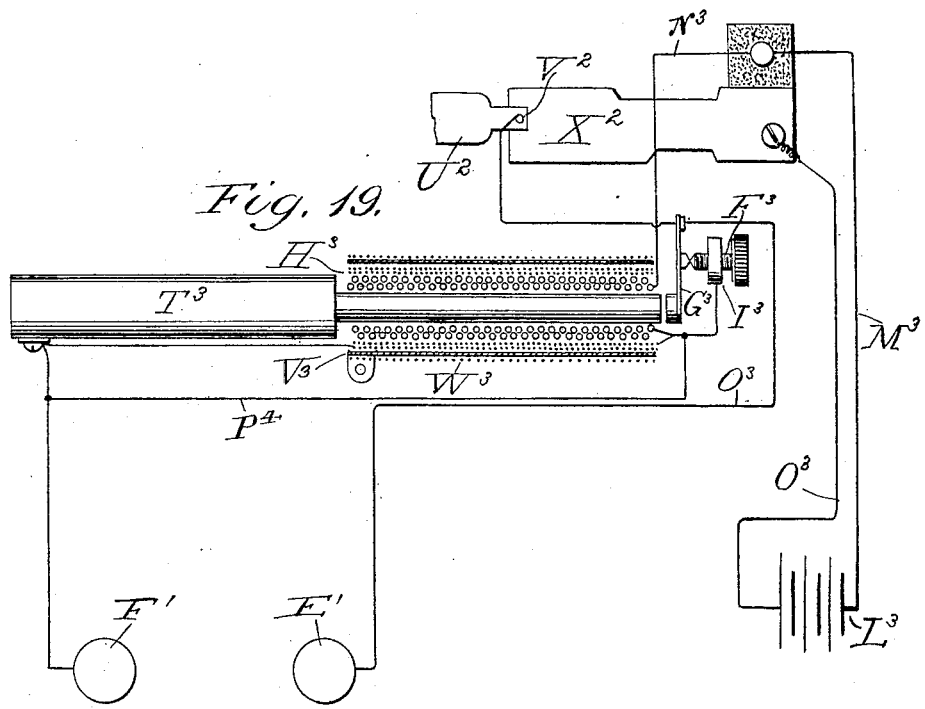

UNITED STATES PATENT OFFICE.

ALFRED W. ROOVERS, OF BROOKLYN, NEW YORK.

COIN-CONTROLLED ELECTRICAL APPARATUS.

No. 912,734.

Specification of Letters Patent.

Patented Feb. 16, 1909.

Application filed October 1, 1906. Serial No. 336,978.

*To all whom it may concern:*

Be it known that I, ALFRED W. ROOVERS, a citizen of the United States, residing at Brooklyn, in the county of Kings and State of New York, have invented certain new and useful Improvements in Coin - Controlled Electrical Apparatus, of which the following is a specification.

Figure 1:
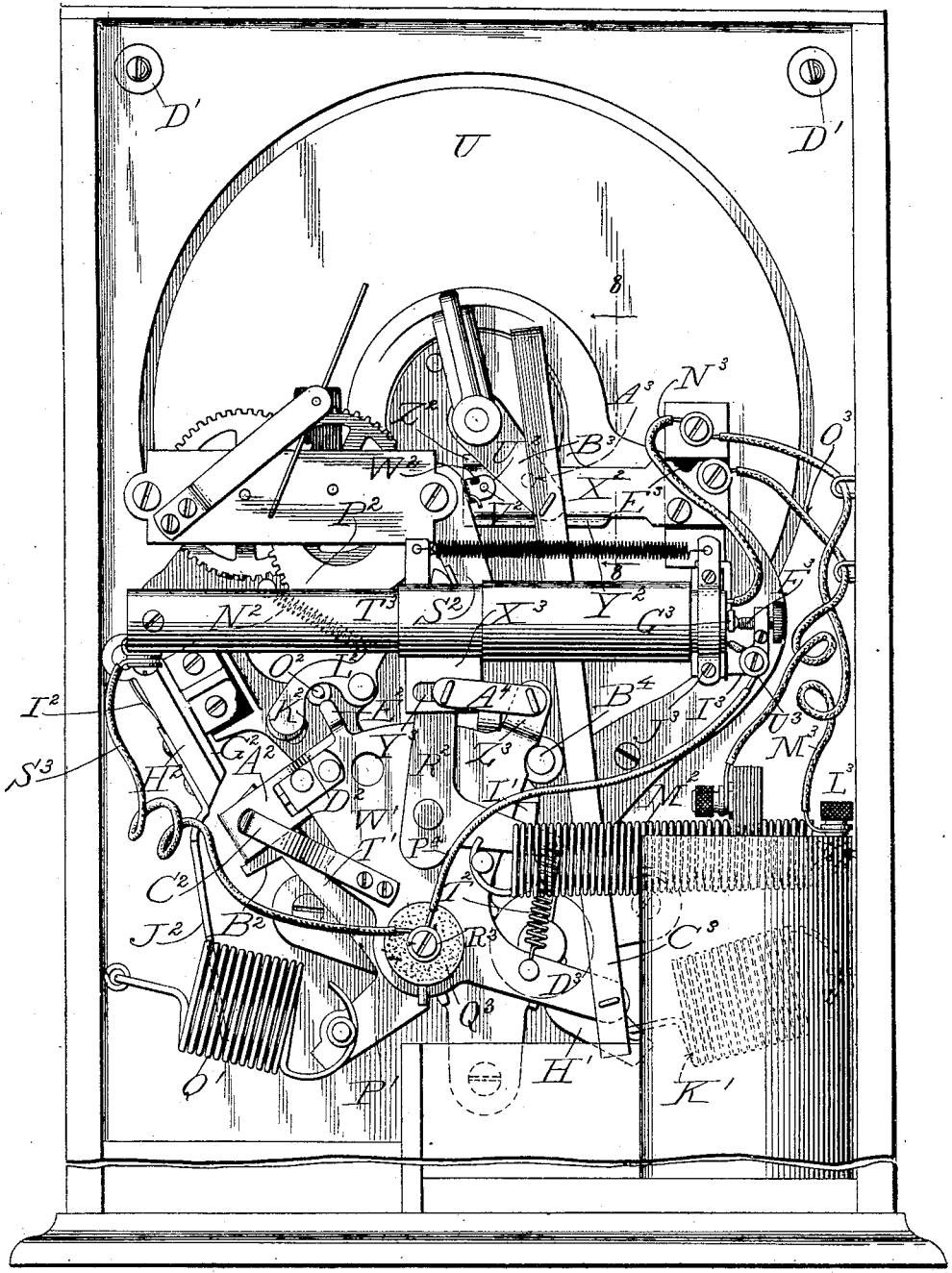
Figure 2:
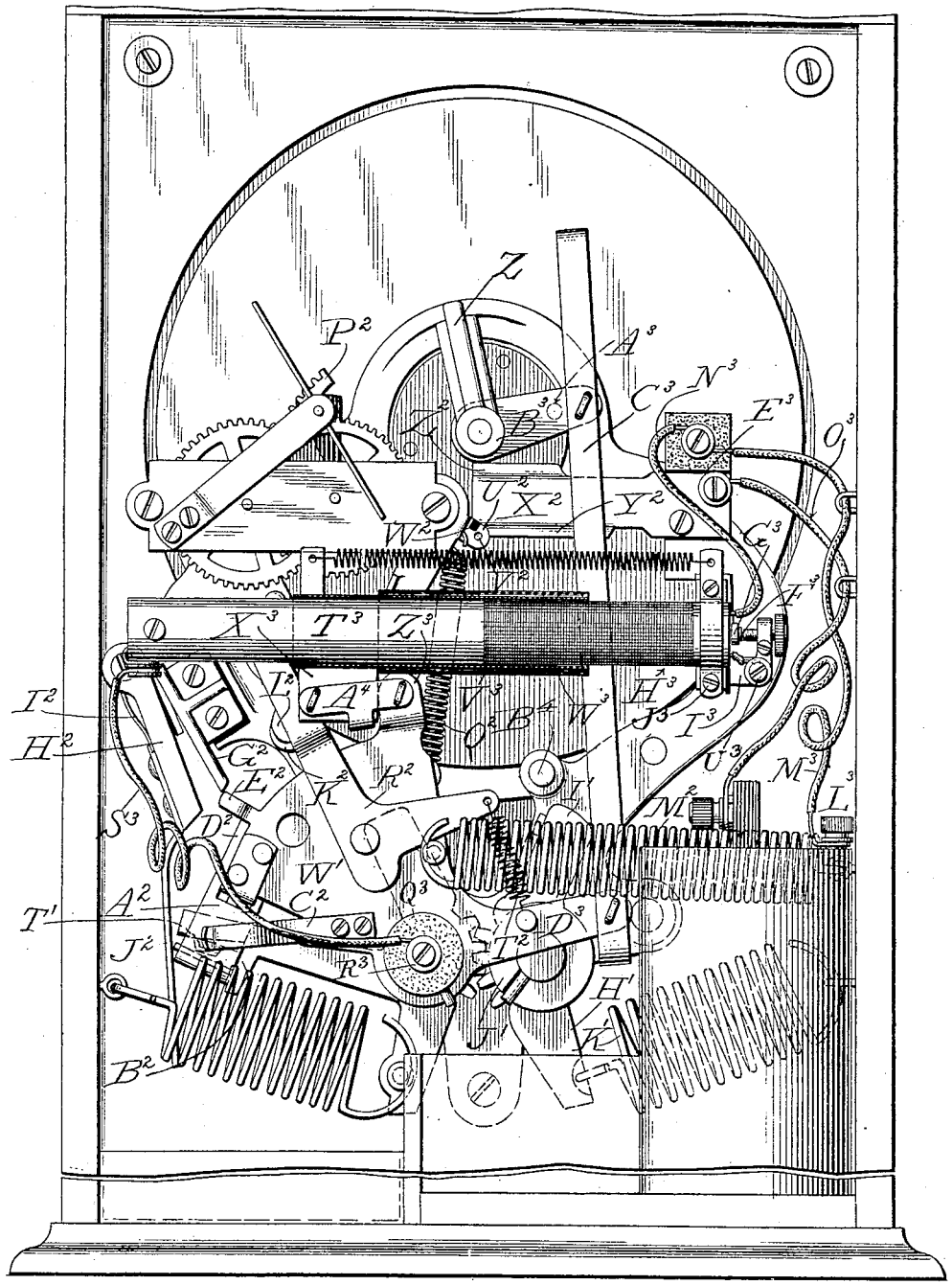

My present invention pertains to improvements in coin-controlled electrical apparatus, the construction and advantages of which will be hereinafter fully set forth, reference being had to the annexed drawings wherein:

Figure 1 is a rear elevation of the apparatus, the door which is employed to close the casing being omitted; Fig. 2, a similar view, the coin having been introduced, the parts locked together thereby, and the handles which the user grasps being drawn down; Fig. 3, a side elevation of the mechanism, the casing being shown in section; Fig. 4, a top plan view of the mechanism; Fig. 5, a detail sectional view of one of the handles;
Fig. 6, a transverse sectional view, on the line 6—6 of Fig. 5; Fig. 7, an elevation of the clock mechanism, the traveling contact finger and the member which receives the coin and also positions the contact finger;
Fig. 8, a vertical sectional view, on the line 8—8 of Fig. 1; Fig. 9, a detail perspective view of the contact finger; Fig. 10, a perspective view of the plate which carries the coin-receiver, the arm which resets the contact finger, and also carries and moves the arm which throws the spring contact plate out of contact with the traveling finger; Fig. 11, a detail perspective view of a portion of the casing; Fig. 12, a similar view of the supporting frame for the mechanism; Fig. 13, a front elevation of the cabinet, showing the actuating handles and the indicating mechanism; Fig. 14, a rear view of the rotatable indicating disk; Fig. 15, a front view of the same; Fig. 16, a front view of the cabinet (the cover-plate and the glass carried thereby being omitted) showing the handles as slightly depressed and the indicator correspondingly shifted; Fig. 17, a like view showing the handles as further depressed; Fig. 18, an elevation of the geared members secured to the handle shafts, the locking arm carried thereby and the allied parts; and Fig. 19, a diagrammatic view of the circuits of the apparatus.

The main object of the present invention is to provide a simple and efficient means for controlling the secondary circuit, whereby the flow of the current is graduated and the passage of the full volume of the current prevented at the beginning of the operation, the increase being gradual and under absolute control of the user of the machine.

A further object is to provide two movable handles, so connected that they move in unison, one handle being insulated from the other.

A further object is to provide an accurate and attractive indicating mechanism, whereby the extent of movement of the handles, and consequently the strength of the current passing therethrough and through the user, will be indicated.

A further object is to provide a construction whereby the mechanism may be completely assembled and while in such condition introduced into the cabinet and secured thereto.

With these and other objects in view I will now proceed to a detail description of the apparatus.

The cabinet, designated by A, is preferably mounted upon and secured to a casting B, Fig. 13, which in turn surmounts a column or pedestal C, though of course the cabinet may be placed in any desired position.

The front face of the cabinet is provided with a circular opening, Figs. 3 and 11, the edge being rabbeted or formed with a shoulder D, see Fig. 11. Extending downwardly from said circular opening is a recess E, the lower edge of which is defined by two semicircular recesses F, which form seats for the hubs or cylindrical bearings G and H, extending outwardly from the main frame or casting I, upon which the mechanism is mounted. The frame is provided with laterally extending lugs J, K and L, Figs. 12 and 18, through which screws are passed into the rear side of the front of the cabinet, other screws (see Fig. 1) being passed through the body of the frame into the cabinet.

A circular plate M, preferably of tin and having a sheet of paper secured to it, is fastened over the opening in the front of the cabinet and rests against the shoulder D. Said plate, as will best be seen upon reference to Figs. 13, 16 and 17, is provided with a spiral opening or slit N, the inner end of which terminates in a heart-shaped figure O, printed, preferably in red, on the plate M. The central portion of the plate will preferably be supported by integral cross-pieces P and Q, and said plate will also by preference be provided with two oppositely-disposed series of small openings R and S.

Secured upon a disk T and in rear of the plate M is a second rotary or oscillating plate U, said plate being provided upon its face with a substantially spirally-disposed blue zone V and with a red zone W, the zones occupying such positions that when the handles are elevated, or when the operative mechanism is not locked thereto, as will hereinafter appear, the blue zone underlies the spiral slit N and the red zone appears beneath the series of openings R and S. When, however, the handles are connected to the operative mechanism and the plate or disk U is caused to revolve to a greater or less extent according to the degree to which the handles are depressed, the red zone will be exposed, appearing first at the inner or heart-shaped end of the slit, and gradually extending until, if the handles be fully depressed, entirely underlying the slit. At the same time the blue field or zone V will gradually pass away from beneath the series of openings, being replaced by the red. Plate U also carries an indicator or pointer X, Figs. 15 and 16, which normally underlies the cross-piece P, so as to be hidden from view. Said pointer passes adjacent to a series of numbers, say from 0 to 1000, arranged adjacent to the edge of the upper portion of the spiral slit. Thus one can secure a relatively accurate measurement of the current taken at different times. Disk T is secured upon the outer end of shaft Y, which is mounted in the supporting frame or casting I and in an overhanging bracket Z formed at the upper end thereof, see Fig. 8. The indicating mechanism thus constructed and the opening E through which the hubs are passed in the act of assembling the machine are covered and protected by a face-plate or casting A', which is formed with a central opening in which is mounted a glass plate B'. Casting A' is also provided with a series of depending fingers C' which pass between and to each side of the hubs G and H and thus covers the entire front of the mechanism. Screws are passed through the outer fingers and into the casing, and tap-screws D' (Fig. 1) are passed from the inside of the casing into lugs formed upon the upper portion of the face-plate.

E' and F' represent the two handles which are grasped by the user and depressed from a normal horizontal, at varying degrees, to a substantially vertical position. Stem or axle G' of handle E', see Fig. 18, has securely pinned to its inner end a casting comprising downwardly-extending arm H', upwardly-extending arm I' and a gear or toothed section J'; a spring K' being secured to the lower end of arm H' and serving normally to draw the arm toward the adjacent side of the cabinet, or in other words to throw the upper arm I' over toward the center of the machine, at which time the handles will occupy a horizontal position.

Handle F' is insulated from the metallic framing of the machine and is constructed, preferably, in the manner shown in Figs. 5 and 6. The handle proper is provided with a reduced end which is seated in an insulating bushing L', the end and bushing being secured to the angular socket-piece M' by a fiber through-pin N'. The angle piece in turn is secured to an axle or stem O' which is seated in the hub H. Pinned to the stem or axle is a casting or member comprising a lower arm P' to which is secured a spring Q' serving to draw it outwardly, an upper arm R', which under the stress of the spring is thrown over and into contact with the rubber bumper S' carried by arm I' and a coin-arresting and locking arm T'. The casting or member is also provided with a gear or toothed section U' which meshes with gear J', whereby both handles must of necessity move in unison, and by reason of the action of the springs will normally occupy a horizontal position. Loosely journaled upon stem O' is a hub V' which carries or has formed therewith a plate W' best shown in Fig. 10.

The plate carries an arm X' having an inturned end Y', which, with the similar end Z' of a pivoted arm $A^2$, forms a temporary abutment against which the coin may be pressed by the upper end of the arm T', the coin at such time being held against vertical or edgewise movement by the finger $B^2$ extending from the arm T', see Figs. 7 and 18. Arm $A^2$ is pressed over toward arm X' by a spring $C^2$, and is prevented from swinging too far by a stop-finger $A^4$ which comes into contact with the arm X', thereby holding the finger-piece $D^2$, which is formed as a part of arm $A^2$, a slight distance from the fixed arm or stop $E^2$. Thus it will be seen that when a coin is introduced into the machine through the coin-slot $F^2$, Figs. 13, 16 and 17, whence it passes through the coin-way formed by the fixed member $G^2$ and the pivoted lower member $H^2$, Figs. 1, 2 and 3, it will pass between the arms X' and $A^2$ and come to rest in the position above noted. A spring $I^2$ tends to hold the pivoted member $H^2$ up toward the fixed member. Said pivoted member is provided at its lower end with a downwardly extending finger or arm $J^2$ which stands in line with the forward sharp edge of the coin-locking finger or arm T', see Fig. 3. With a coin in place, a downward movement of the handles will cause a corresponding rocking movement of the plate W', the plate moving back and forth with each and every movement of the handles until such time as the coin may be freed and the handles thus unlocked from the plate. This unlocking takes place when the handles are brought back to the horizontal position. As the handles approach the horizontal the beveled forward edge $K^2$ of a pivoted dog $L^2$ passes in between the finger $D^2$ and the stop $E^2$, see Fig. 7, thereby causing arm $A^2$ to swing away from arm $X'$, and permitting the coin to ride off of the finger $B^2$ and drop into a receptacle below. Plate $W'$ being thus freed, will swing to the right, Fig. 1, under the pull of a relatively heavy spring $M^2$, one end of which is secured to a stud extending from the plate. The action of the spring is limited by a stop-arm $B^4$, Figs. 1 and 2, which extends from the frame or casting I.

Dog $L^2$ is held in its proper position by a spring $N^2$ secured to its rear end and a stop pin $O^2$ which extends outwardly beneath its forward portion from frame or casting I. When the coin is first inserted and the coin arm plate are locked together, the stop $E^2$ and finger-piece $D^2$ ride against the flat under face of the dog and swing the same on its pivot, spring $N^2$ immediately throwing the outer beveled end downward as soon as the stop and finger-piece have passed into such position that the dog may act to separate them upon the return movement of the parts. Plate $W'$ also serves to place the spring of the time mechanism under stress, to positively withdraw the spring contact plate out of the range of the movable contact controlled by the clock or time mechanism, and to actuate the sleeve which determines the intensity of the current which passes through the handles.

The time mechanism, which determines the duration of the passage of the current, comprises a pivoted elbow-lever $P^2$, carrying at one end a sector-rack which meshes with suitable gearing, as is usual, to regulate the movement of said lever as it is swung about its pivot by a spring $Q^2$. The spring comes into action when the handles are depressed (to a greater or less extent), see Fig. 2, and the upwardly-extending arm of an elbow-lever $R^2$ pivotally mounted on the plate $W'$, is moved out of contact with the bearing face $S^2$ formed upon the lower end of the elbow-lever $P^2$. Elbow-lever $R^2$ normally travels with the plate $W'$, and is held in its proper relation to said plate and bearing face $S^2$ by a spring $T^2$, which is attached to the lower arm of the lever $R^2$ and a fixed portion of plate $W'$. Lever $P^2$ is formed with a finger or extension $U^2$ in which is mounted a contact point or stud $V^2$ and an insulating block $W^2$.

When the machine is in operation, contact point $V^2$ bears against and rides over the face of a spring plate $X^2$ having its upper and lower edges $Y^2$ and $Z^2$ adjacent to its outer free end inturned or angularly disposed, in order that the contact point may ride freely on and off of the lower edge of the plate, and so that the like action may take place with an insulated stud or finger $A^3$ secured to an arm $B^3$ mounted on or formed with shaft Y, see Fig. 8. A relatively long link $C^3$ is pivotally connected to the outer end of the arm $B^3$ and to arm $D^3$ formed as a part of plate $W'$. It will thus be seen that as the plate is oscillated a like motion will be imparted to shaft Y and through it to the indicating disk T. The insulated stud or finger $A^3$ is so positioned that it will deflect the plate $X^2$ away from the contact when the handles are in their normal horizontal position, thereby insuring the breaking of the circuit, which will presently be described. The contact-block $W^2$ comes against the plate as the contact-point $V^2$ rides off of the flat face of the plate, and holds said plate away from the point, thus breaking the circuit while the handles are still held in a depressed position. The period of passage of the current is, of course, equal to the time it takes the contact-point to travel from its normal position on the plate (Fig. 1) to the edge of the plate (Fig. 7). Contact-plate $X^2$ is secured to a block $E^3$ of insulating material, and the contact screw $F^3$ which works in conjunction with the vibrator $G^3$ of the induction coil $H^3$ is also mounted on a block $I^3$ carried by an arm $J^3$ (Fig. 4) of the casting I, the block being insulated from the arm. The vibrator is carried by a depending bracket $K^3$ secured to the upper face of the arm $J^2$. The primary circuit is from the positive side of the battery $L^3$, through the conductors $M^3$ and $N^3$, through the primary winding of the coil to the screw $F^3$, through the vibrator and to the frame or casting I, through bracket $K^3$; then if the contact-point $V^2$ is bearing on plate $X^2$ through said plate, through wire $O^3$ back to the battery. The insulated handle may also be included in the primary circuit by running a wire, $P^3$, Figs. 1 and 19, from the binding-screw $R^3$ to the binding-screw $U^3$. The secondary or induced current includes the handles in its circuit. As before stated, handle $F'$ is insulated from the frame. A wire $P^3$ has one end connected to the reduced end of the handle, the body of the wire which is insulated lying in a slot formed in stem $O'$ and passing through an insulating washer $O^3$ pinned to the inner end of the stem. The end of the wire is connected through a screw $R^3$ to one end of a wire $S^3$, which wire in turn is connected to one end of the secondary winding of the coil, said end being carried in a groove or channel formed in the side of a cylindrical extension $T^3$ of the coil spool. The opposite end of the secondary winding is preferably connected into the primary winding which is connected by the screw $U^3$ to the block $I^3$. The path of the secondary current is as follows: starting with handle $F'$, through wire $P^3$, screw $R^3$, wire $S^3$, the secondary winding to screw U³, block I³, contact screw F³, vibrator G³, to frame or casting I and to the uninsulated handle E'.

To regulate the intensity of the induced current I provide the following means: Surrounding the induction coil is a metallic sleeve or tube V³, preferably of brass, about which is wound a wire W³, the ends of which are connected to each other, or to the tube. This tube with its winding is designed to be moved back and forth over the induction coil winding and acts as a damper or regulator to control the intensity of the induced current. The sleeve is provided with a downwardly-extending bracket or plate X³, having a slot Y³ formed therein. Plate W' is provided with an upwardly-projecting arm Z³, and a link A⁴ is pivotally connected thereto, the opposite end of the link carrying a pin which extends through the slot, the connection permitting a slight forward movement of the plate W' independent of the sleeve. As will be readily seen, the farther the handles are depressed and consequently the farther the plate W' is rocked, the more the tube will be withdrawn from over the coil. The intensity of the induced current increases as the tubular member is withdrawn from the coil, and inasmuch as its position is regulated by the depression or raising of the handles, the amount of current which will pass through the handles is at all times under the control of the user. The direction of current may be changed by simply shifting the battery connections.

Having thus described my invention, what I claim is:

1. In combination with a casing provided with an opening in its front face; a frame or casting supporting the assembled operative mechanism embodying handles arranged to be passed through the opening and to stand in front of the casing, and also an indicating mechanism which occupies a position in line with the opening; and means for securing the casting in place within the casing whereby the handles may be passed beyond the front of the casing and the opening in the face thereof closed.

2. In combination with a casing provided with an opening in its front face; a frame or casting supporting the operative mechanism, embodying handles arranged to stand in front of the casing and also an indicating mechanism which occupies a position in line with the opening; means for securing the casting in place within the casing; and a cover plate secured to the front of the casing, whereby the mechanism in its assembled form may be secured to the casing.

3. In combination with a casing provided with an opening in its front face; a casting provided with outwardly-extending hubs, said hubs being seated in depressions formed in the casing at the lower portion of the opening; means for securing the casting within the casing; and a cover plate secured to the front of the casing, the lower end of the plate embracing the hubs.

4. In combination with a casing provided with an opening in its front face; a casting provided with outwardly-extending hubs arranged to be seated within recesses formed in the casing; means for securing the casting within the casing; and a cover plate provided with downwardly-extending fingers adapted to pass to each side of the hubs.

5. In an apparatus of the character specified, the combination of an oscillating operating plate; a pair of swinging handles, one of said handles being electrically insulated from the plate; means adapted, through a deposited coin, to connect said plate to said handles; an induction coil, the secondary circuit whereof is connected to the handles; means, connected with the operating plate for controlling the intensity of the induced current which is in circuit with the handles; and means actuated by the plate for closing the circuit.

6. In an apparatus of the character specified, the combination of a pair of interconnected, movable handles; an induction coil, the winding whereof is in circuit with said handles; a sleeve surrounding the coil and provided with a wire wound around the same; and means adapted, through a deposited coin, to effect a connection between the sleeve and the handles, whereby the sleeve will be shifted or moved off of the coil as the handles are operated.

7. In an apparatus of the character specified, the combination of a pair of handles geared to each other so as to move in unison; an induction coil, the winding whereof is in circuit with said handles; a sleeve surrounding the coil and slidably mounted thereon; a winding carried by the sleeve; a pivoted actuating plate; connections between said plate and the sleeve, means adapted, through a deposited coin, to effect a connection between said plate and the handles; and means actuated by the plate for closing the circuit.

8. In an apparatus of the character specified, the combination of a pair of handles connected together to move in unison; an induction coil provided with an extension of its spool to one side of the windings; a sleeve overlying the coil and spool; and means adapted, through a deposited coin, to effect a connection between the handles and the sleeve, whereby when the handles are moved the sleeve will be withdrawn from the coil and over the extension and the induced current which is in circuit with the handles accordingly strengthened.

9. In an apparatus of the character specified, the combination of an indicator; a pair of movable handles; connections intermediate the handles and indicator; an induction coil; a contact-plate arranged in the circuit of said coil; and means operated by the connection between the handles and indicator to move the plate and thereby interrupt the circuit.

10. In an apparatus of the character specified, the combination of a spring contact-plate; an induction coil, the primary coil whereof is connected at one side to the plate; a movable contact-point standing in line with the plate; a clock mechanism for moving the point; and means for withdrawing the plate out of contact with the point when the apparatus is in its inoperative condition.

11. In an apparatus of the character specified, the combination of a pair of movable handles geared together so as to move in unison; an operating plate; a clock mechanism; a contact-point movable thereby; means carried by the plate for placing the spring of the clock mechanism under stress; a contact-plate standing in line with the contact-point; an induction coil in series with the plate and point; and means connected with the operating plate for controlling the intensity of the induced current which is in circuit with the handles.

12. In an apparatus of the character specified, the combination of a supporting frame; a pair of handles mounted therein, one of said handles being electrically insulated from the frame; means for causing said handles to move in unison; an actuating plate; means adapted, through a deposited coin, to effect a connection between said plate and the handles; a clock mechanism; a movable contact actuated by said mechanism; means carried by the plate for placing the spring of the clock mechanism under stress; a reciprocating indicator; connections between said indicator and plate; an insulated contact-plate standing in line with the movable contact; means for holding said plate out of contact with the contact-point when the apparatus is at rest; an induction coil the terminals of the primary coil of which are connected to the frame and plate, respectively, while the terminals of the secondary coil are connected to the frame and insulated handle; and a dampening device for the coil connected to and movable with the actuating plate.

13. In an apparatus of the character specified, the combination of a pair of handles; means for causing them to move in unison; an induction coil; means for varying the intensity of the induced current of the coil, which current passes through the handles; an actuating member for said means; means adapted, through a deposited coin, to effect a connection between said actuating member and the handles; an indicator, comprising a fixed plate having a spirally-disposed slot therein, and a reciprocating or oscillating disk arranged behind the same having zones of different color on its face; and connections between said actuating member and the disk, whereby when the disk is moved the color exposed through the slot will gradually change.

14. In an apparatus of the character specified, the combination of a pair of handles; means for causing them to move in unison; an induction coil; means for varying the intensity of the induced current of the coil, which current passes through the handles; an actuating member for said means; means, adapted through the deposit of a coin, to effect a connection between said actuating member and the handles; an indicator movable in unison with the handles, the indicator comprising a fixed plate having a figure placed centrally thereof, with a spiral slot formed in the plate the inner end whereof joins the figure, and a reciprocating disk arranged behind the plate, said disk having zones of different color on its face; and connections between said actuating member and the disk, whereby when the disk is moved the color exposed through the slot will gradually change.

15. An indicating device comprising a plate having a centrally-disposed figure, and a spiral slot extending from the figure outwardly; a reciprocable disk located in rear of the plate, said disk having zones of different color on its face; and an indicator also carried by the disk, said indicator when the disk is rotated appearing through the slot aforesaid and passing by a series of graduations formed on the plate adjacent to the edge of the slot.

In testimony whereof I have signed my name to this specification in the presence of two subscribing witnesses.

ALFRED W. ROOVERS.

Witnesses:
REMSEN RUSHMORE,
HENRY H. RAYMOND.